March 17, 1953  A. P. DOUGLAS ET AL  2,631,654

REMOVABLE SEAT COVER AND SEAT STRUCTURE THEREFOR

Filed April 7, 1951

INVENTORS,
ALVIN P DOUGLAS
LEONARD J. WALTERS
BY
Albert R. Golrick
ATTORNEY

Patented Mar. 17, 1953

2,631,654

UNITED STATES PATENT OFFICE 2,631,654

REMOVABLE SEAT COVER AND SEAT STRUCTURE THEREFOR

Alvin P. Douglas, Cleveland, and Leonard J. Walters, Shaker Heights, Ohio, assignors to The Murray Ohio Manufacturing Company, Cleveland, Ohio, a corporation of Ohio Application April 7, 1951, Serial No. 219,846

5 Claims. (Cl. 155—182)

The present invention relates to a seat structure with a self-holding seat cover, and more particularly to a seat and seat cover for infant vehicles such as baby walkers, though the invention may be adapted to other environments. This application is a division of our prior application, Serial No. 163,253, filed May 20, 1950.

In baby walkers and similar vehicles or in other articles having a seat structure for infant use, a seat cover is desirable which is readily removable for cleaning, so that the seating surface may be kept in a sanitary condition with a minimum of effort. Hence, a cover should be easily removed and replaced and, further, be of simple, durable construction. Such a seat cover, of course, protects the under-lying seat structure, not merely from soil, but also from the deleterious effects of urine and other fluids. This protection is important where the seat bottom is joined to seat side and back structures forming a corner or seam where dirt or urine might lodge to cause gradual disintegration of the material adjacent.

Hence the general object of this invention is the provision of a simple, durable seat cover and seat structure, wherein the seat cover is readily removable and replaceable, yet securely retained against accidental displacement.

Other objects and advantages of the invention will be apparent from the following detailed description of the invention as applied to a baby walker, reference being made to the accompanying drawings wherein—

Figure 1:
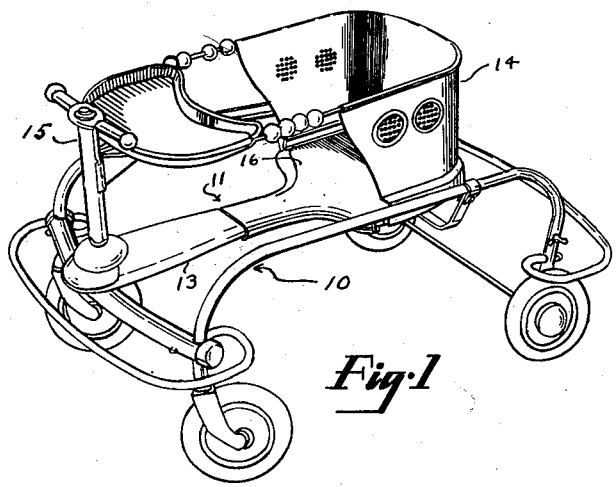
Fig. 1 is a general view in perspective of a baby walker embodying this invention.
Figure 6:
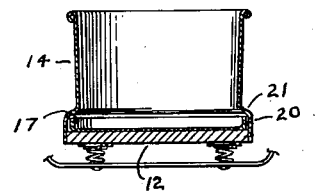
Fig. 6 is a vertical section similar to Fig. 5 taken along the line 6—6 of Fig. 2.
Figure 3:
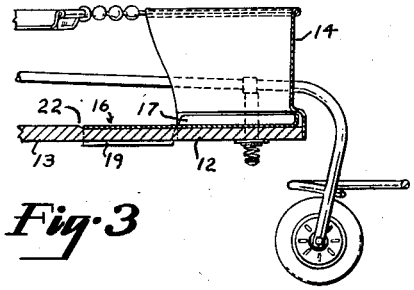
Fig. 3 is a partial longitudinal section taken along the line 3—3 in Fig. 2.
Figure 2:
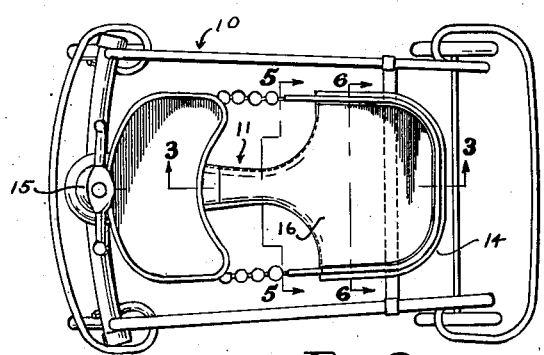
Fig. 2 is a top view corresponding to Fig. 1.
Figure 4:
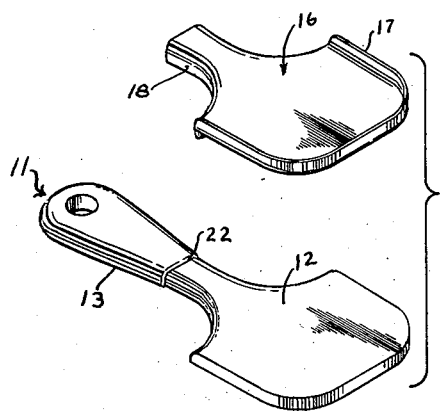
Fig. 4 is a detailed view of the passenger supporting or seat member of the vehicle with a detachable seat cover of corresponding form.
Figure 5:
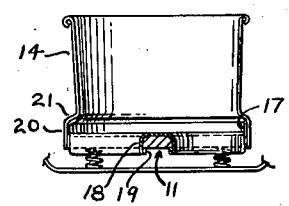
Fig. 5 is a section taken through the seat structure and seat cover along the line 5—5 in Fig. 2.

The baby walker shown in the drawings as embodying the present invention comprises a wheeled tubular frame or chassis 10 on which is mounted a seat structure including a rider supporting member 11, having a rear or seat bottom portion 12 and a forward extension 13 and a back rest structure 14. Since the chassis of the vehicle forms no part of the present invention, it is not described in detail here. The back rest structure 14, formed of sheet metal or other suitable material, is fastened along its bottom edge to the rear portion of the member 11 and has its upper edge rolled to provide a smooth, safe edge. Usually this upper edge is beaded over a rod which extends forwardly in curved shape toward the front post 15 to enclose the passenger space of the vehicle. The seat member 11 may be of the general shape of the detail shown in Fig. 4 and preferably is formed of wood, though sheet metal pressed to a corresponding shape may be used, while the seat cover 16 has a generally corresponding shape as also shown in Fig. 4. Where pressed metal is used to form the member 11, the seat cover, in addition to the functions detailed in the foregoing introduction to the specification, serves the further purpose of insulating the infant passenger seated in the vehicle from direct contact with the metal forming the seat bottom. The detachable seat cover 16 is formed of a resilient flexible material, preferably being formed of some flexible plastic material to the general shape shown in Fig. 4. The manner in which the cover 16 conforms in shape to the member 11 to fit thereon is shown in Figs. 3, 5 and 6.

An upright flange 17 is provided at the sides and rear of this member while the curved portions 18 extend downwardly along the corresponding curved portions of member 11 and have an inwardly flanged or beaded edge 19 which projects inwardly under the bottom edge of member 11 to retain the seat cover thereon. Due to the resiliency of the plastic material used for the seat cover it may be snapped on or off the member 11, being held there by the edges 19 due to resiliency of material used. The back rest 14 has an outwardly offset portion 20 to accommodate the flanged portion 17 of the seat cover 16 in the groove-forming offset 20 between the shoulder 21 and the member 13, and thereby to retain the same in place. A shoulder 22 provided on the forward extension 13 on member 11 prevents the cover from sliding forward. The cover 16 is put on the seat by inserting the flanged portion under the shoulder 21 at the forward end of the back rest, sliding the cover back into position, and then pushing the curved forward part of the cover downward until the edges 19 snap into position underneath the seat. Such a cover with flanged sides and rear has the advantage of preventing dirt and moisture from reaching the joint between the seat member 11 and the seat back 14 should an infant wet the vehicle, and hence prevents deterioration, particularly rusting at the joint where metal is used, while at the same time the cover itself is readily removed for cleaning.

For use in other environments, the seat and cover structure may be correspondingly modified. For example, in a chair type seat where there is no forward projection as in member 13, the flanged portion 18 would be disposed transversely across the front edge of the seat, with the bottom of the flange similarly turned inwardly under the seat front edge to form an inward holding bead like to bead 19.

We claim:

1. In a juvenile vehicle such as a baby walker and the like having a seat member provided with a forward extension at the middle of the seat portion, a removable seat cover comprising a flat portion covering the seat area of said member; an upwardly extending continuous flange around the two sides and back of said flat portion; a forward extension covering part of the length of said forward extension of the seat member; and downwardly extending flanges conformed to both sides of said forward extension of the seat member, said downwardly extending flanges having the lower edges beaded inwardly to extend under the seat member and hold the cover in place, said cover being formed of material having sufficient resiliency to allow said downwardly extending flanges to be spread apart for removing and replacing the cover on said member.

2. In a juvenile vehicle such as a baby walker and the like, a seat member provided with a forward extension at the middle of the seat portion; a back rest member extending around the sides and back of the seat portion, said back rest having an inwardly extending shoulder formation spaced above the seat member; and a removable seat cover, said cover including a flat portion covering the seat area of said member, an upwardly extending continuous flange around the two sides and back of said flat portion, said flange extending under said shoulder formation, a forward extension covering part of the length of said forward extension of the seat member, and downwardly extending flanges conformed to both sides of said forward extension of the seat member, said downwardly extending flanges having the lower edges beaded inwardly to extend under the seat member and hold the cover in place, said cover being formed of a material having sufficient resiliency to allow said downward flanges to be spread apart for removing and replacing the cover on said member.

3. In a juvenile vehicle such as a baby walker or the like, a seat member provided with a forward extension at the middle of the seat portion; a back rest member extending around the sides and back of the seat portion; and a removable seat cover including a flat portion covering the seat area of said member, an upwardly extending continuous flange around the two sides and back of said flat portion, a forward extension covering part of said forward extension of the seat member, and downwardly extending flanges conformed to both sides of said forward extension of the seat member, said downwardly extending flanges having the lower edges beaded inwardly to extend under the seat member and hold the cover in place; said forward extension of the seat member being provided with a shoulder adapted to engage a front edge portion of said forward extension of the cover to prevent forward movement thereof.

4. In a juvenile vehicle such as a baby walker and the like, a seat member provided with a forward extension at the middle of the seat portion; a back rest member extending around the sides and back of the seat portion; and a removable seat cover, said cover including a flat portion covering the seat area of said member, an upwardly extending continuous flange around the two sides and back of said flat portion, a forward extension covering part of the length of said forward extension of the said seat member, and downwardly extending flanges conformed to both sides of said forward extension of the seat member, said downwardly extending flanges having the lower edges beaded inwardly to extend under the seat member and hold the cover in place, said cover being formed of a material having sufficient resiliency to allow said downward flanges to be spread apart for removing and replacing the cover on said member.

5. A seat structure having a removable seat surface cover, said structure comprising a member adapted to provide a seat bottom portion; back rest means extending upwardly from and attached to the back and sides of said seat bottom portion; and a removable seat cover shaped to extend over the seat area of said member having an upwardly extending flange continuous about the two sides and rear edge of the cover, said seat cover being also provided at the front portion thereof with flange means extending downwardly along and under the forward edge of the said seat bottom portion and adapted to grip said member and hold the cover in place, said cover being formed of a plastic having sufficient resiliency to allow said downward flange means to be spread apart from normal position in removing and replacing the cover on said member.

ALVIN P. DOUGLAS.
LEONARD J. WALTERS.

REFERENCES CITED

The following references are of record in the file of this patent:

UNITED STATES PATENTS

| Number | Name | Date |
| --- | --- | --- |
| 2,017,178 | Braukhof | Oct. 15, 1935 |
| 2,220,238 | Hansburg | Nov. 5, 1940 |